United States Patent
Sinha et al.

(10) Patent No.: US 10,244,469 B2
(45) Date of Patent: Mar. 26, 2019

(54) POWER MANAGEMENT FOR PERSONAL BSS CONTROL POINT (PCP)

(71) Applicant: BROADCOM CORPORATION, Irvine, CA (US)

(72) Inventors: Rajesh Kumar Sinha, San Diego, CA (US); Payam Torab Jahromi, Laguna Niguel, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 264 days.

(21) Appl. No.: 15/095,620

(22) Filed: Apr. 11, 2016

(65) Prior Publication Data

US 2016/0330684 A1 Nov. 10, 2016

Related U.S. Application Data

(60) Provisional application No. 62/158,472, filed on May 7, 2015, provisional application No. 62/314,464, filed on Mar. 29, 2016.

(51) Int. Cl.
*H04W 52/02* (2009.01)
*H04W 40/24* (2009.01)
*H04W 40/00* (2009.01)
*H04B 7/0452* (2017.01)
(Continued)

(52) U.S. Cl.
CPC ...... *H04W 52/0209* (2013.01); *H04B 7/0452* (2013.01); *H04J 11/00* (2013.01); *H04W 40/005* (2013.01); *H04W 40/244* (2013.01); *H04L 27/2601* (2013.01); *Y02B 60/50* (2013.01); *Y02D 70/00* (2018.01)

(58) Field of Classification Search
CPC combination set(s) only.
See application file for complete search history.

(56) References Cited

U.S. PATENT DOCUMENTS

2013/0329576 A1* 12/2013 Sinha ............... H04W 52/0229
370/252
2015/0351125 A1* 12/2015 Kwon ............... H04W 74/002
370/336

FOREIGN PATENT DOCUMENTS

WO    WO 2014007509 A1 *  1/2014  ........... H04W 74/04

* cited by examiner

*Primary Examiner* — Yee F Lam
(74) *Attorney, Agent, or Firm* — Garlick & Markison; Randy W. Lacasse

(57) ABSTRACT

A wireless communication device (alternatively, device) includes a processing circuitry configured to support communications with other wireless communication device(s) and to generate and process signals for such communications. In some examples, the device includes a communication interface and a processing circuitry, among other possible circuitries, components, elements, etc. to support communications with other wireless communication device (s) and to generate and process signals for such communications. A device communicates with other devices informing them of energy, power, etc. management operation (e.g., with respect to low power or sleep mode). When the device receives responses from each of the other devices that they are informed of the operation of the device, then device performs such energy, power, etc. management. Alternatively, when response(s) are not received from all of the other devices, the device performs such energy, power, etc. management after a period of time (e.g., number of beacon intervals (BIs)).

18 Claims, 10 Drawing Sheets

(51) Int. Cl.
*H04J 11/00* (2006.01)
*H04L 27/26* (2006.01)

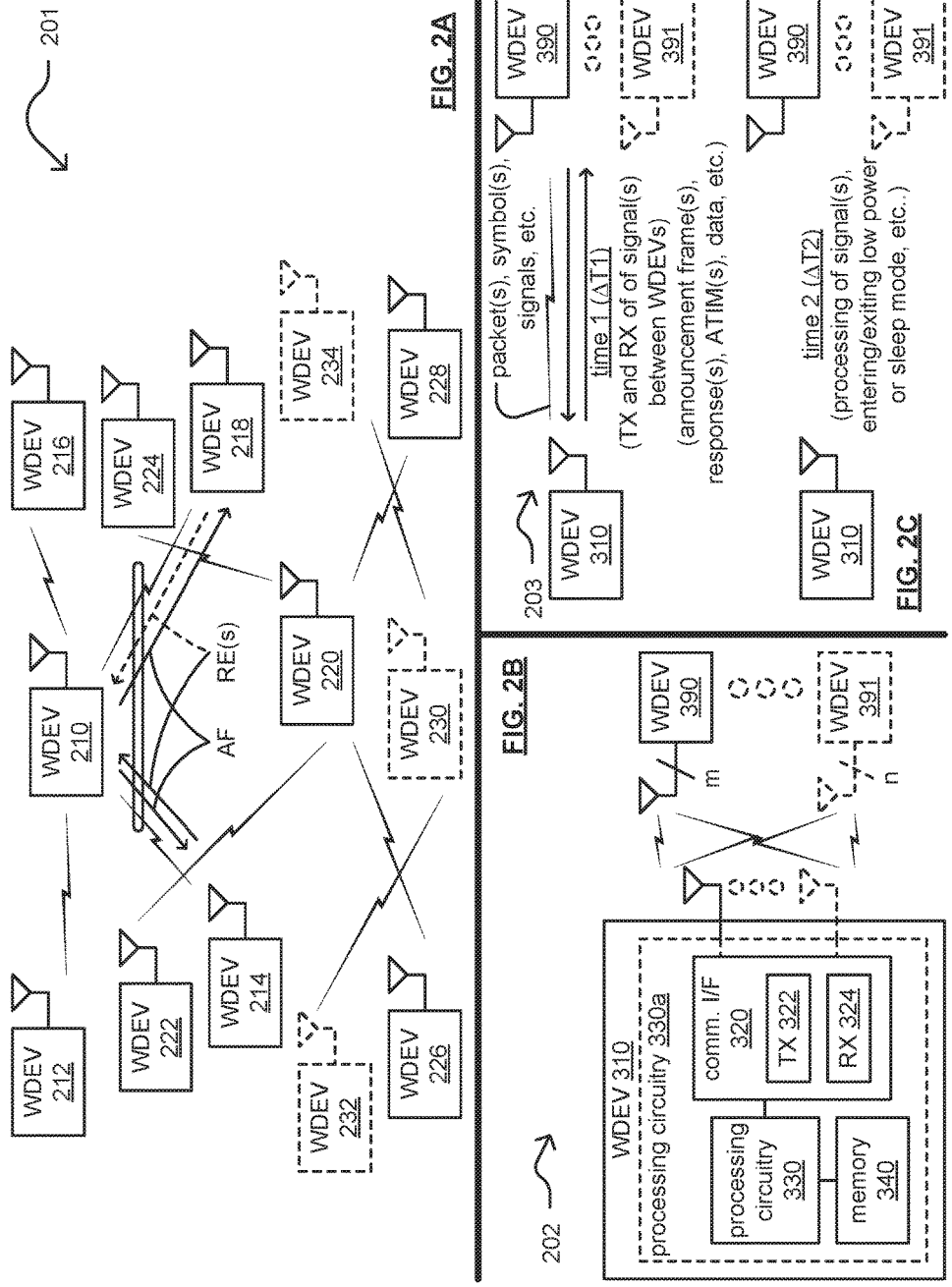

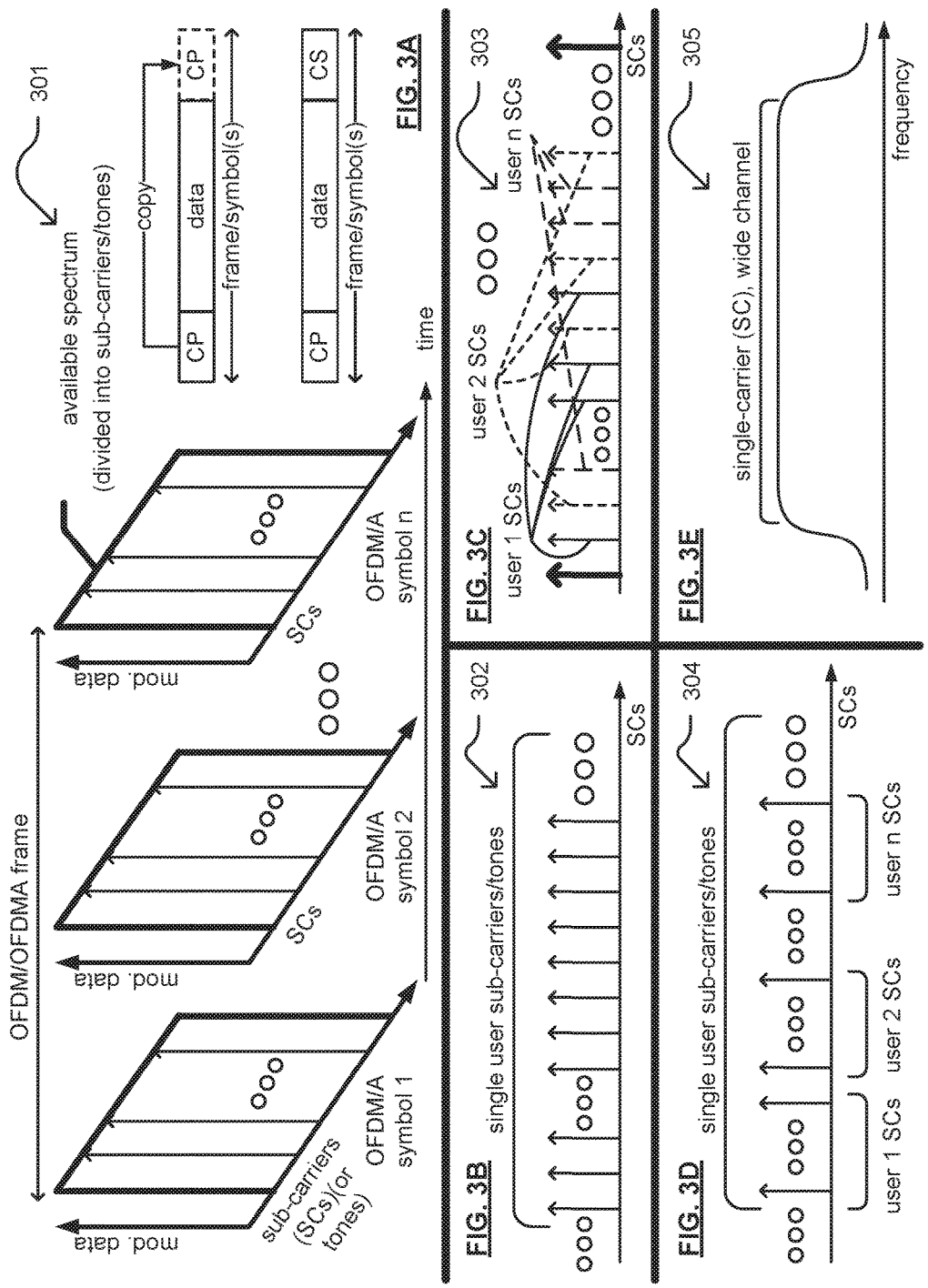

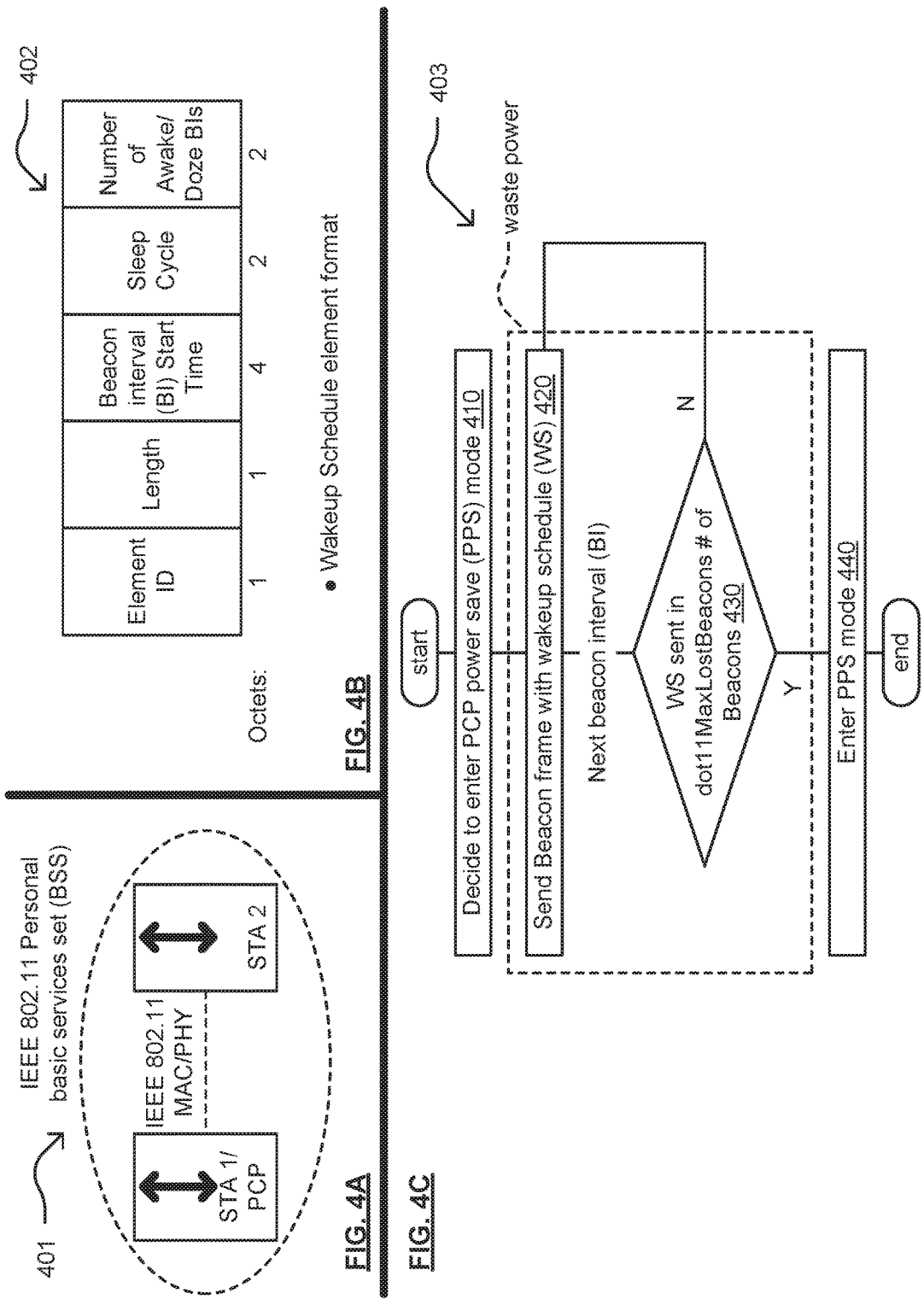

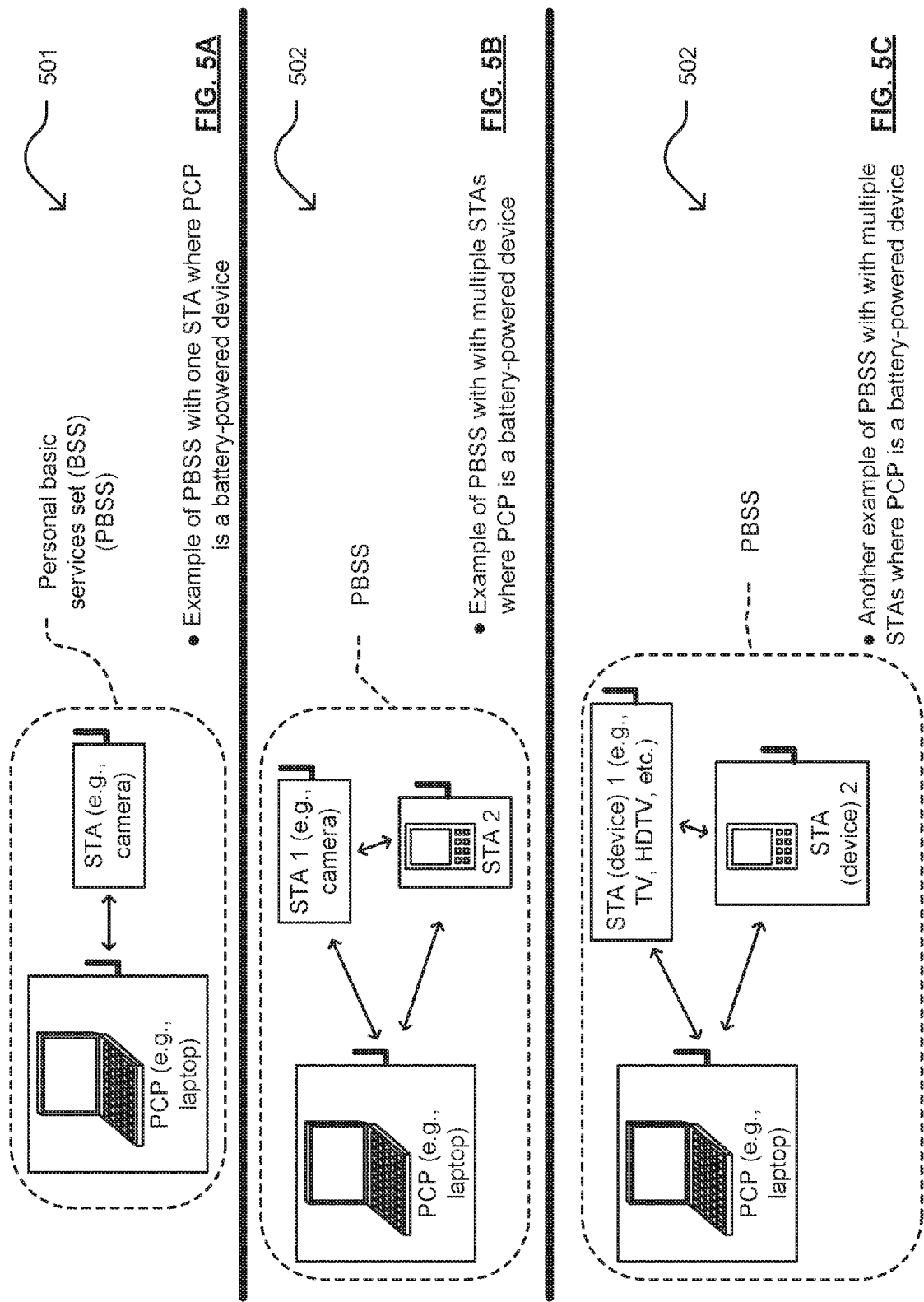

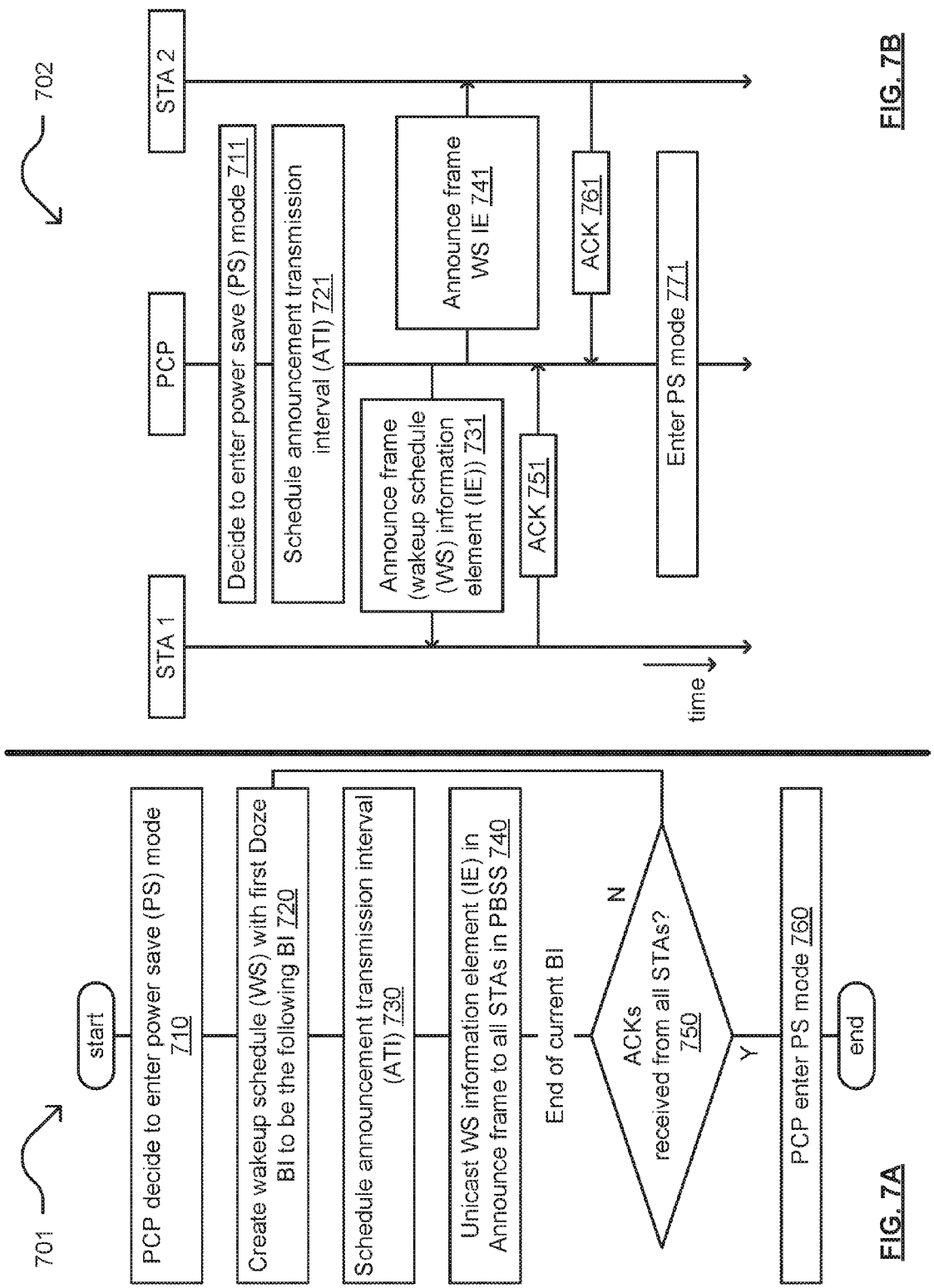

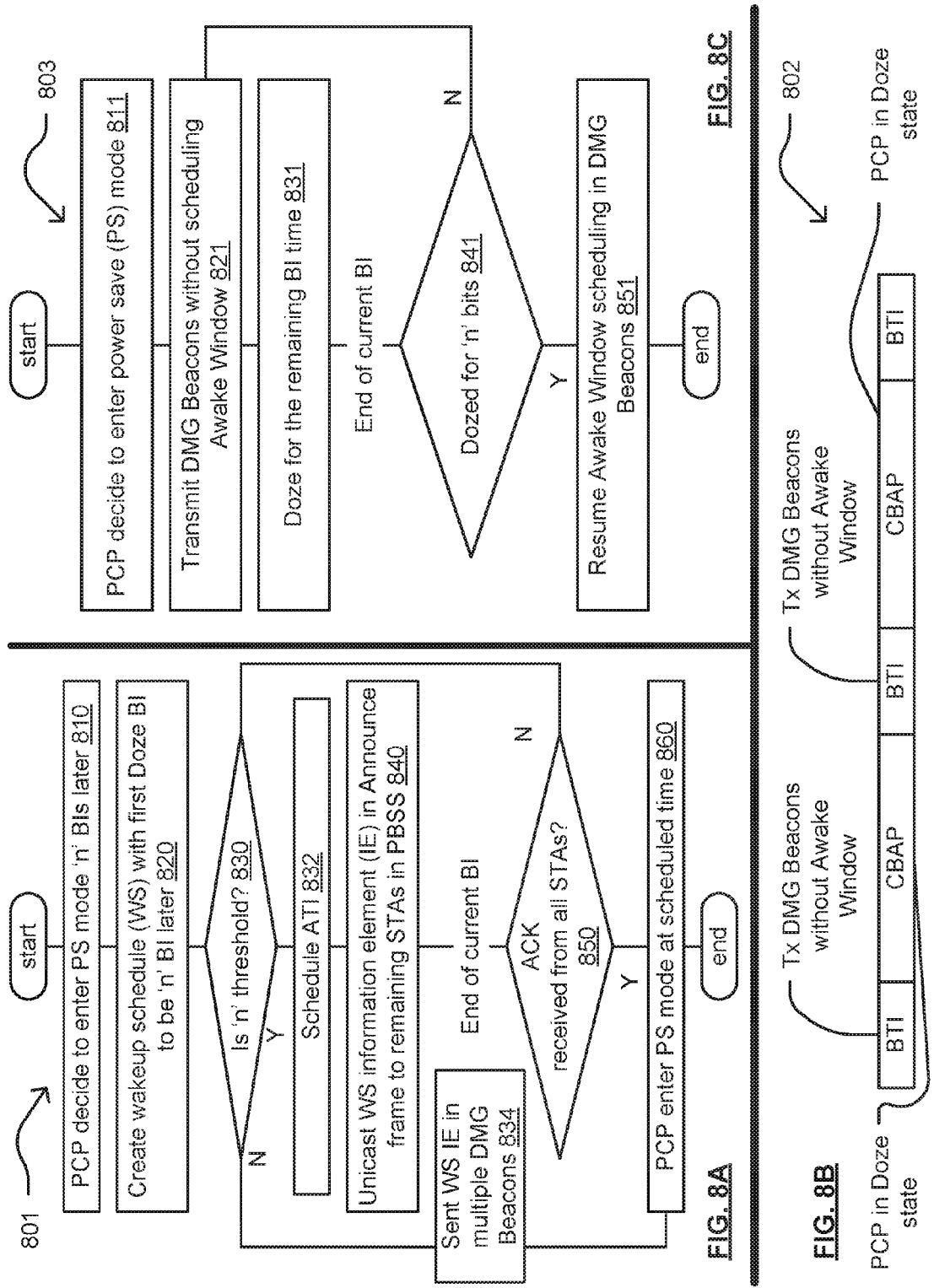

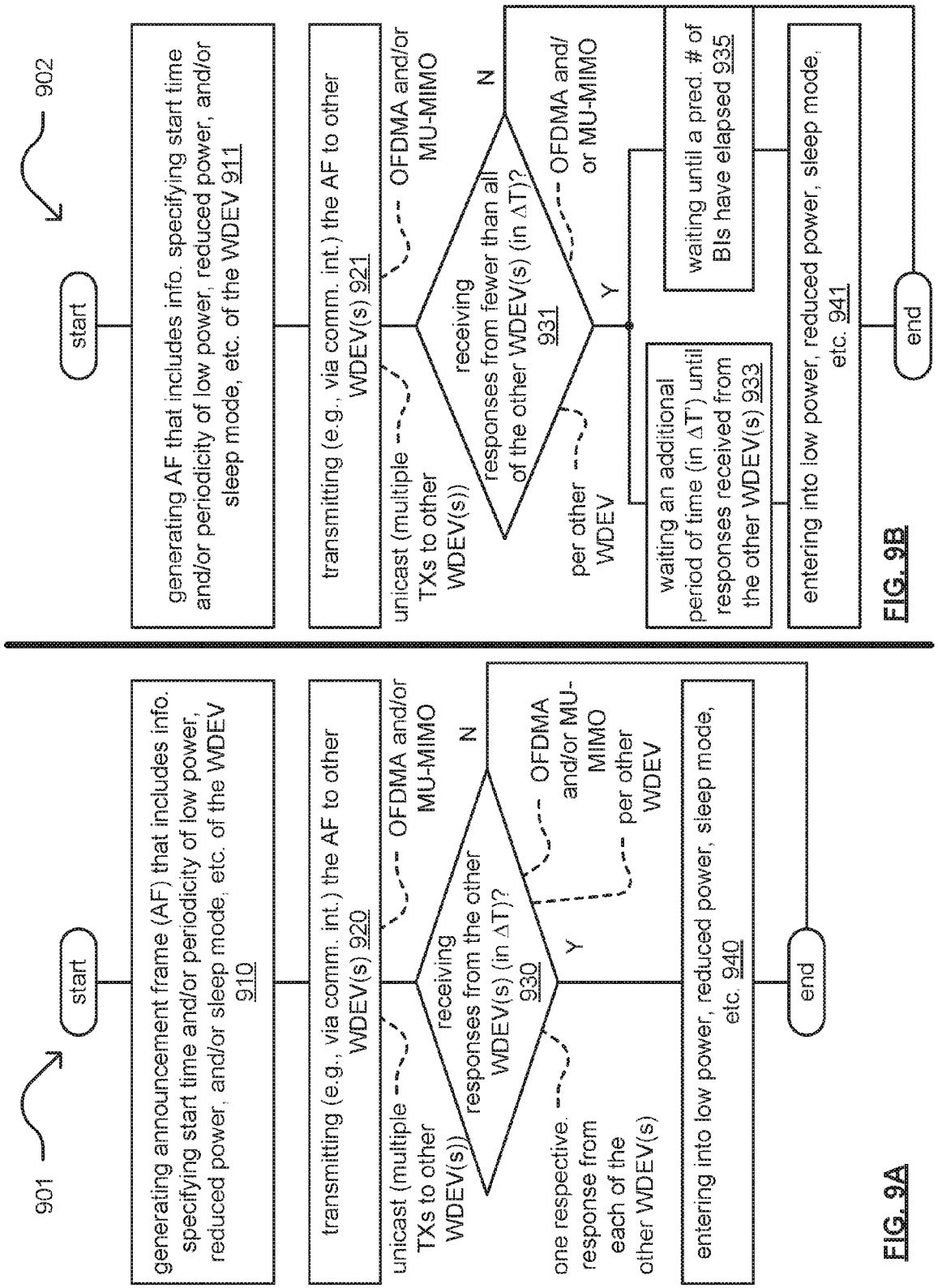

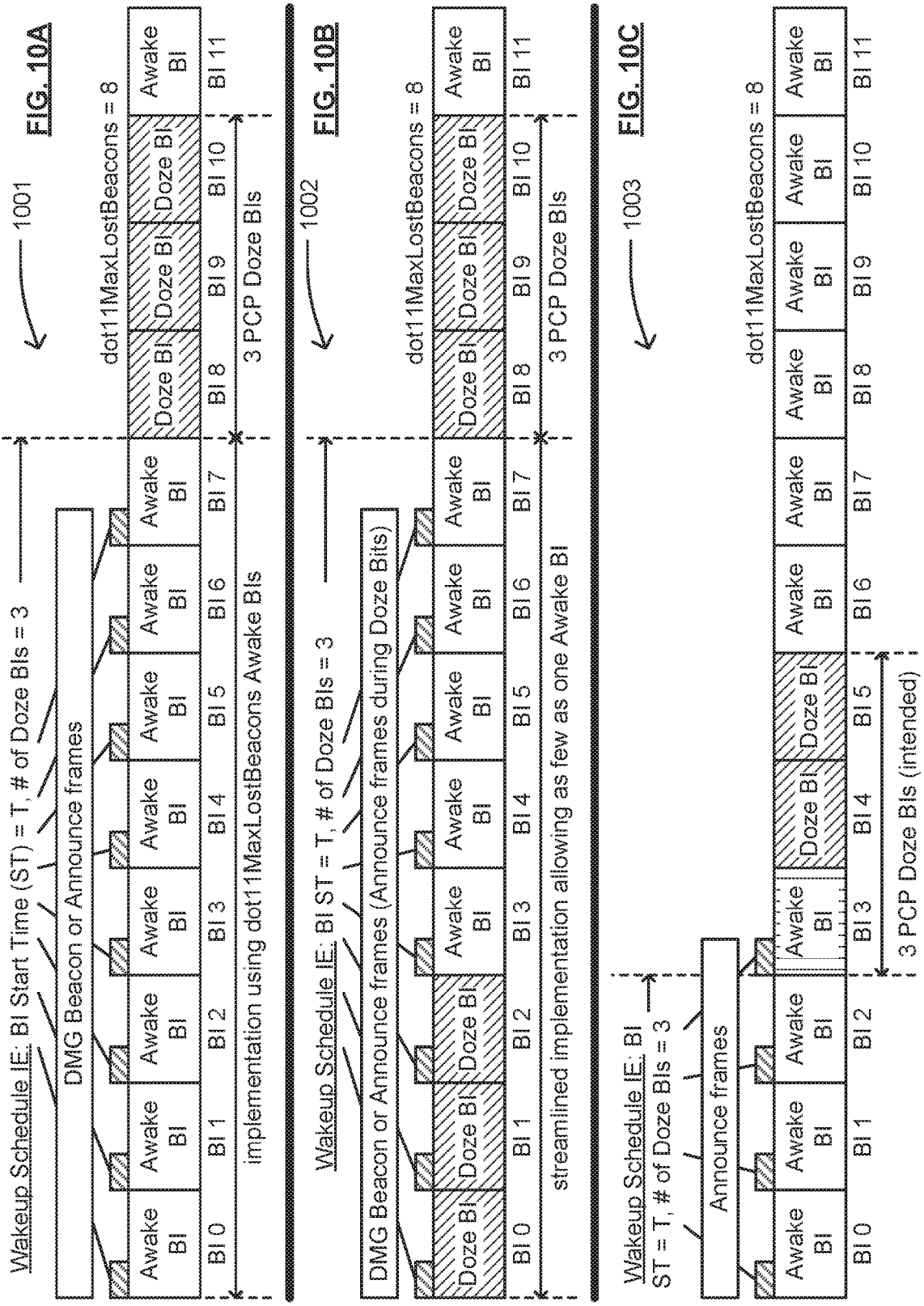

POWER MANAGEMENT FOR PERSONAL BSS CONTROL POINT (PCP)

CROSS REFERENCE TO RELATED PATENTS/PATENT APPLICATIONS

Provisional Priority Claims

The present U.S. Utility patent application claims priority pursuant to 35 U.S.C. § 119(e) to U.S. Provisional App. Ser. No. 62/158,472, entitled "Power management for personal BSS control point (PCP)," filed May 7, 2015; and U.S. Provisional App. Ser. No. 62/314,464, entitled "Power management for personal BSS control point (PCP)," filed Mar. 29, 2016, both of which are hereby incorporated herein by reference in their entirety and made part of the present U.S. Utility patent application for all purposes.

BACKGROUND

Technical Field

The present disclosure relates generally to communication systems; and, more particularly, to power management and associated communications among wireless communication devices within single user, multiple user, multiple access, and/or multiple-input-multiple-output (MIMO) wireless communications.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

The prior art does not provide adequate or sufficient means by wireless communication devices may operate effectively to conserve power, energy, battery life, etc. There continues to be much room for improvement in the operation of wireless communication devices and the manner in which they can operate more efficiently in terms of power and energy management.

BRIEF DESCRIPTION OF THE SEVERAL VIEWS OF THE DRAWINGS

FIG. 2A is a diagram illustrating an embodiment of dense deployment of wireless communication devices.

FIG. 2B is a diagram illustrating an example of communication between wireless communication devices.

FIG. 2C is a diagram illustrating another example of communication between wireless communication devices.

FIG. 3A is a diagram illustrating an example of orthogonal frequency division multiplexing (OFDM) and/or orthogonal frequency division multiple access (OFDMA).

FIG. 3B is a diagram illustrating another example of OFDM and/or OFDMA.

FIG. 3C is a diagram illustrating another example of OFDM and/or OFDMA.

FIG. 3D is a diagram illustrating another example of OFDM and/or OFDMA.

FIG. 3E is a diagram illustrating an example of single-carrier (SC) signaling.

FIG. 4A is a diagram illustrating an example of a logical architecture of a personal basic services set (BSS) (PBSS).

FIG. 4B is a diagram illustrating an example of a wakeup schedule (WS) information element (IE).

FIG. 4C is a diagram illustrating an embodiment of a method for execution by one or more wireless communication devices for a personal BSS control point (PCP) to enter the power save (PS) mode.

FIG. 5A is a diagram illustrating an example of a PBSS with one wireless station (STA) where PCP is a battery-powered device.

FIG. 5B is a diagram illustrating an example of a PBSS with multiple STAs where PCP is a battery-powered device.

FIG. 5C is a diagram illustrating another example of a PBSS with multiple STAs where PCP is a battery-powered device.

FIG. 7A is a diagram illustrating an embodiment of a method for execution by one or more wireless communication devices.

FIG. 7B is a diagram illustrating an example of a message sequence between various wireless communication devices (e.g., a personal BSS control point (PCP) and two STAs: STA 1 and STA 2).

FIG. 8A is a diagram illustrating another embodiment of a method for execution by one or more wireless communication devices.

FIG. 8B is a diagram illustrating an example of beacon transmission intervals (BTI) and contention-based access periods (CBAPs).

FIG. 8C is a diagram illustrating another embodiment of a method for execution by one or more wireless communication devices.

FIG. 9A is a diagram illustrating another embodiment of a method for execution by one or more wireless communication devices.

FIG. 9B is a diagram illustrating another embodiment of a method for execution by one or more wireless communication devices.

FIG. 10A is a diagram illustrating an example of a transition to PCP power save (PPS) mode.

FIG. 10B is a diagram illustrating another example of a transition to PPS mode.

FIG. 10C is a diagram illustrating another example of a transition to PPS mode.

DETAILED DESCRIPTION

Figure 1:
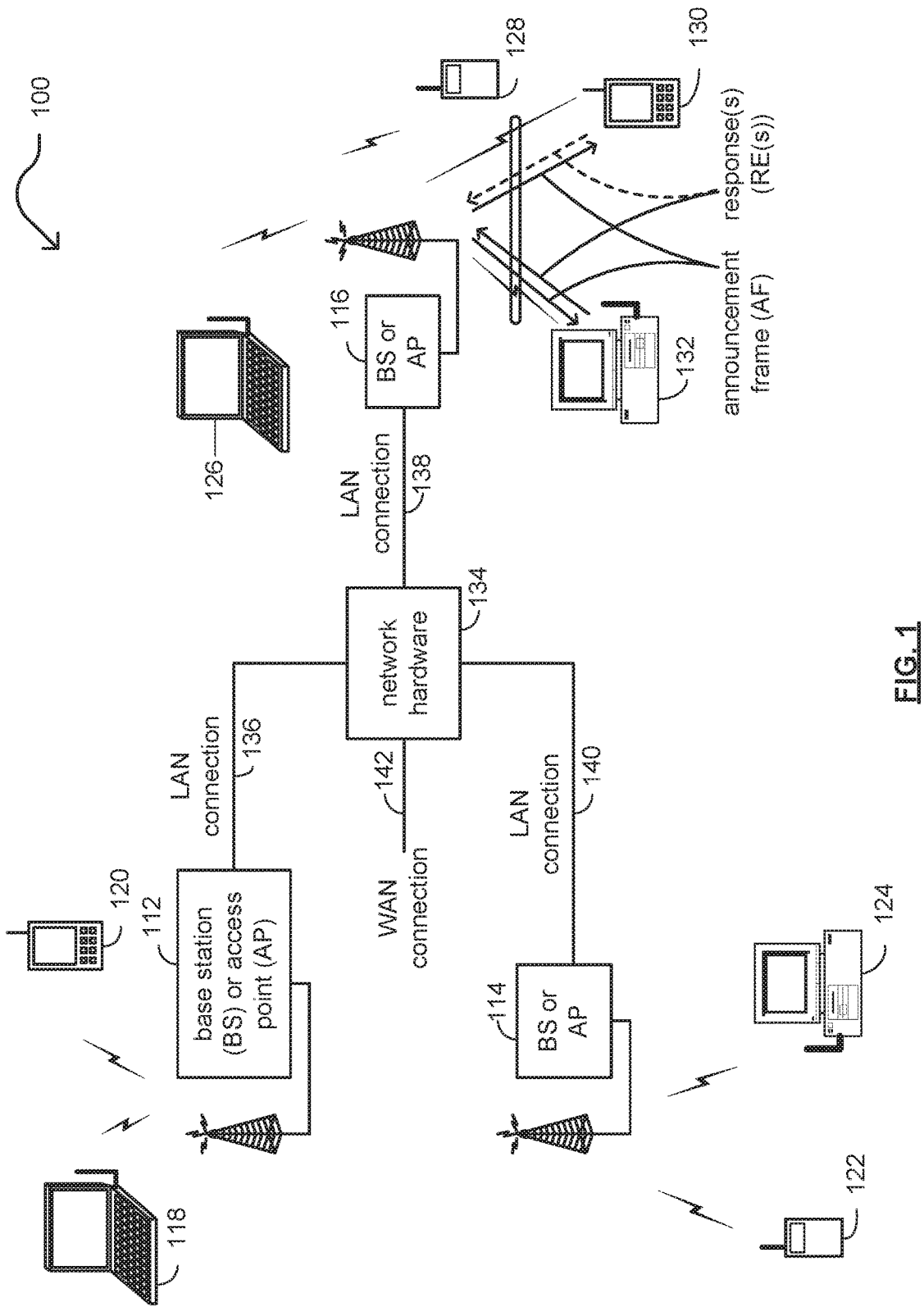
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. Other examples of such wireless communication devices 118-132 could also or alternatively include other types of devices that include wireless communication capability. The details of an embodiment of such wireless communication devices are described in greater detail with reference to FIG. 2B among other diagrams.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100.

Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processing circuitry and/or a communication interface to support communications with any other of the wireless communication devices 118-132 and BSs or APs 112-116. In an example of operation, a processing circuitry and/or a communication interface implemented within one of the devices (e.g., any one of the WDEVs 118-132 and BSs or APs 112-116) is/are configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2A below, "device 210" when referring to "wireless communication device 210" or "WDEV 210," or "devices 210-234" when referring to "wireless communication devices 210-234"; or with respect to FIG. 2B below, use of "device 310" may alternatively be used when referring to "wireless communication device 310", or "devices 390 and 391 (or 390-391)" when referring to wireless communication devices 390 and 391 or WDEVs 390 and 391). Generally, such general references or designations of devices may be used interchangeably.

The processing circuitry and/or the communication interface of any one of the various devices, WDEVs 118-132 and BSs or APs 112-116, may be configured to support communications with any other of the various devices, WDEVs 118-132 and BSs or APs 112-116. Such communications may be uni-directional or bi-directional between devices. Also, such communications may be uni-directional between devices at one time and bi-directional between those devices at another time.

In an example, a device (e.g., any one of the WDEVs 118-132 and BSs or APs 112-116) includes a communication interface and/or a processing circuitry (and possibly other possible circuitries, components, elements, etc.) to support communications with other device(s) and to generate and process signals for such communications. The communication interface and/or the processing circuitry operate to perform various operations and functions to effectuate such communications (e.g., the communication interface and the processing circuitry may be configured to perform certain operation(s) in conjunction with one another, cooperatively, dependently with one another, etc. and other operation(s) separately, independently from one another, etc.). In some examples, such a processing circuitry includes all capability, functionality, and/or circuitry, etc. to perform such operations as described herein. In some other examples, such a communication interface includes all capability, functionality, and/or circuitry, etc. to perform such operations as described herein. In even other examples, such a processing circuitry and a communication interface include all capability, functionality, and/or circuitry, etc. to perform such operations as described herein, at least in part, cooperatively with one another.

In an example of implementation and operation, a wireless communication device (e.g., any one of the WDEVs 118-132 and BSs or APs 112-116, consider the BS or AP 116) includes a processing circuitry that communicates with other wireless communication devices (e.g., any other of the WDEVs 118-132 and/or BSs or APs 112-116, consider the WDEV 132 and WDEV 130) and is configured to generate and transmit such signals thereto and receive, process, interpret, etc. received there from.

In an example of implementation and operation, the BS or AP 116 is configured to generate an announcement frame that includes information specifying a start time and a periodicity corresponding to a low power or sleep mode of the BS or AP 116. The BS or AP 116 transmits the announcement frame to the WDEV 132 and WDEV 130. The BS or AP 116 enters into the low power or sleep mode after receiving a plurality of responses respectively from the plurality of other wireless communication devices within a predetermined period of time. Note that one respective response is received from each of the WDEV 132 and WDEV 130 (e.g., first response from WDEV 132, and second response from WDEV 130).

In another example of implementation and operation, the BS or AP 116 is configured to delay the start time by an extended time period when fewer than all responses are received respectively from the WDEV 132 and WDEV 130 within the predetermined period of time (e.g., one or no response is received from the WDEV 132 and WDEV 130). In such an example, the BS or AP 116 enters into the low power or sleep mode after receiving the responses respectively from the WDEV 132 and WDEV 130 within another predetermined period of time that includes the predetermined period of time and the extended time period. For example, then one respective response is received from each of the WDEV 132 and WDEV 130 (e.g., first response from WDEV 132, and second response from WDEV 130) within this other predetermined period of time that includes the predetermined period of time and the extended time period, then the BS or AP 116 enters into the low power or sleep mode.

In another example of implementation and operation, the BS or AP 116 is configured to enter into the low power or sleep mode when fewer than all responses are received respectively from the WDEV 132 and WDEV 130 within the predetermined period of time (e.g., one or no response is received from the WDEV 132 and WDEV 130, yet at least one response is not received from the WDEV 132 or the WDEV 130, yet at least one response is not received from the WDEV 132 or the WDEV 130) and also after a predetermined number of beacon intervals (BIs) have elapsed. In some examples, the BS or AP 116 makes transmissions via broadcast during these predetermined number of BIs that inform the other WDEVs of future low power or sleep mode operation of the BS or AP 116, and after the predetermined number of BIs have elapsed, the BS or AP 116 may operate based on an assumption that the WDEV 132 and WDEV 130 are informed of its future low power or sleep mode operation and may enter into it. Also, in some examples, this predetermined number of BIs occurs after a first BI (e.g., which may be the predetermined period of time). Note also that the BS or AP 116 may transmit the announcement frame more than once during the predetermined period of time (e.g., within a first BI).

In another example of implementation and operation, the BS or AP 116 is configured to portray itself differently to the WDEV 132 or the WDEV 130 depending on whether or not responses are received from them. For example, when no response is received from the WDEV 132, the BS or AP 116 operates in an awake mode with respect to the WDEV 132. In another example, when a response is received from the WDEV 130, the BS or AP 116 operates in a low power or sleep mode with respect to the WDEV 130. In some examples, the BS or AP 116 operates and portrays itself differently to the various other WDEVs (e.g., the WDEV 132 or the WDEV 130) depending on whether response are received there from.

In another example of implementation and operation, the BS or AP 116 is configured to transmit the announcement frame based on unicast signaling to the WDEV 132 and also to transmit the announcement frame based on unicast signaling to WDEV 130. In some examples, the BS or AP 116 is configured to transmit the announcement frame to both the WDEV 132 and WDEV 130 simultaneously or in parallel with one another. In some examples, the BS or AP 116 is configured to transmit the announcement frame to both the WDEV 132 and WDEV 130 sequentially, serially, or one after the other.

Various types of signaling may be used in communications between the various wireless communication devices. For example, the BS or AP 116 may be configured to transmit the announcement frame to the WDEV 132 and WDEV 130 based on orthogonal frequency division multiple access (OFDMA) and/or multi-user multiple-input-multiple-output (MU-MIMO) signaling, and the BS or AP 116 may be configured to receive responses respectively from the WDEV 132 and WDEV 130 based on OFDMA and/or the MU-MIMO signaling. In some examples of implementation and operation, note that the BS or AP 116 is an access point (AP) and/or a personal basic services set (BSS) control point (PCP).

FIG. 2A is a diagram illustrating an embodiment 202 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and APs are packed in a given area (e.g., which may be an area [indoor and/or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

In an example of implementation and operation, the WDEV 210 generates an announcement frame that includes information specifying a start time and a periodicity corresponding to a low power or sleep mode of the WDEV 210. The WDEV 210 transmits the announcement frame to the WDEV 214 and the WDEV 218. The WDEV 210 enters into the low power or sleep mode after receiving responses respectively from the WDEV 214 and the WDEV 218 within a predetermined period of time (e.g., receives a first response from the WDEV 214 and second response from WDEV 218). Note that such responses may be received simultaneously (e.g., such as via OFDMA within a single transmission received by the WDEV 210) or separately via different responses received at different times from the WDEV 214 and the WDEV 218, respectively.

In some instances, when fewer than all responses are received respectively from the WDEV 214 and the WDEV 218 within the predetermined period of time (e.g., one or no response is received from the WDEV 214 and the WDEV 218, yet at least one response is not received from the WDEV 214 or the WDEV 218), the WDEV 210 delays the start time by an extended time period and enters into the low power or sleep mode after receiving the responses respectively from the WDEV 214 and the WDEV 218 within another predetermined period of time that includes the predetermined period of time and the extended time period (e.g., when the WDEV 210 receives response from both the WDEV 214 and the WDEV 218 within this other predetermined period of time).

In even other instances, when fewer than all responses are received respectively from the WDEV 214 and the WDEV 218 within the predetermined period of time (e.g., one or no response is received from the WDEV 214 and the WDEV 218, yet at least one response is not received from the WDEV 214 or the WDEV 218), the WDEV 210 enters into the low power or sleep mode after a predetermined number of beacon intervals (BIs) have elapsed. In some examples, the WDEV 210 makes transmissions via broadcast during these predetermined number of BIs that inform the other WDEVs of future low power or sleep mode operation of the WDEV 210, and after the predetermined number of BIs have elapsed, the WDEV 210 may operate based on an assumption that the WDEV 132 and WDEV 130 are informed of its future low power or sleep mode operation and may enter into it. Also, in some examples, this predetermined number of BIs occurs after a first BI (e.g., which may be the predetermined period of time). Note also that the WDEV 210 may transmit the announcement frame more than once during the predetermined period of time (e.g., within a first BI).

In another example of implementation and operation, the WDEV 210 is configured to portray itself differently to the WDEV 214 and the WDEV 218 depending on whether or not responses are received from them. For example, when no response is received from the WDEV 218, the WDEV 210 operates in an awake mode with respect to the WDEV 218. In another example, when a response is received from the WDEV 214, the WDEV 210 operates in a low power or sleep mode with respect to the WDEV 214. In some examples, the BS or AP 116 operates and portrays itself differently to the various other WDEVs (e.g., the WDEV 214 and the WDEV 218) depending on whether response are received there from.

Note that various forms of signaling may be used between the various WDEVs within this diagram as well as others (e.g., including but not limited to unicast, OFDMA, MU-MIMO, etc. and/or any combination thereof).

FIG. 2B is a diagram illustrating an example 202 of communication between wireless communication devices. A wireless communication device 310 (e.g., which may be any one of devices 118-132 as with reference to FIG. 1) is in communication with another wireless communication device 390 (and/or any number of other wireless communication devices up through another wireless communication device 391) via a transmission medium. The wireless communication device 310 includes a communication interface 320 to perform transmitting and receiving of at least one signal, symbol, packet, frame, etc. (e.g., using a transmitter 322 and a receiver 324) (note that general reference to packet or frame may be used interchangeably).

Generally speaking, the communication interface 320 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the device 310 operates), equalization, pre-equalization, metric generation, symbol mapping and/or de-mapping, automatic gain control (AGC) operations, and/or any other operations that may be performed by an AFE and/or PHY component within a wireless communication device.

In some implementations, the wireless communication device 310 also includes a processing circuitry 330, and an associated memory 340, to execute various operations including interpreting at least one signal, symbol, packet, and/or frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and/or 391 may each include one or more antennas for transmitting and/or receiving of at least one packet or frame (e.g., WDEV 390 may include m antennae, and WDEV 391 may include n antennae).

Also, in some examples, note that one or more of the processing circuitry 330, the communication interface 320 (including the TX 322 and/or RX 324 thereof), and/or the memory 340 may be implemented in one or more "processing modules," "processing circuits," "processors," and/or "processing units" or their equivalents. Considering one example, one processing circuitry 330a may be implemented to include the processing circuitry 330, the communication interface 320 (including the TX 322 and/or RX 324 thereof), and the memory 340. Considering another example, two or more processing circuitries may be implemented to include the processing circuitry 330, the communication interface 320 (including the TX 322 and/or RX 324 thereof), and the memory 340. In such examples, such a "processing circuitry" or "processing circuitries" (or "processor" or "processors") is/are configured to perform various operations, functions, communications, etc. as described herein. In general, the various elements, components, etc. shown within the device 310 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the device 310 includes both processing circuitry 330 and communication interface 320 configured to perform various operations. In other examples, the device 310 includes processing circuitry 330a configured to perform various operations. Generally, such operations include generating, transmitting, etc. signals intended for one or more other devices (e.g., device 390 through 391) and receiving, processing, etc. other signals received for one or more other devices (e.g., device 390 through 391).

In some examples, note that the communication interface 320, which is coupled to the processing circuitry 330, that is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the device 310 may be communicated via any of these types of communication systems.

FIG. 2C is a diagram illustrating another example 203 of communication between wireless communication devices. In an example of implementation and operation, WDEV 310 performs one or more a frame exchange processes with the WDEV 390 and/or the WDEV 391 including signal(s) such as announcement frame(s), response(s), announcement traffic indication message(s) (ATIM(s)), data, etc. communicated between the WDEV 310 and the WDEV 390 and/or the WDEV 391 at or during a first time or time period (e.g., time 1, ΔT1, etc.) and processing of signal(s) at or during a second time or time period (e.g., time 2, ΔT2, etc.) to make various decisions including those related to entering/exiting various power and/or energy management modes of operation including.

In another example of implementation and operation, the WDEV 310 includes both a processing circuitry to perform many of the operations described above and also includes a communication interface, coupled to the processing circuitry, that is configured to support communications within a satellite communication system, a wireless communication system, a wired communication system, a fiber-optic communication system, and/or a mobile communication system. The processing circuitry is configured to transmit and/or receives such signal(s) to/from the WDEV 390 and/or WDEV 391 via the communication interface.

FIG. 3A is a diagram illustrating an example 301 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Note that sub-carrier or tone may be used interchangeably. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processing circuitry and the communication interface of a communication device may be configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 3B is a diagram illustrating another example 302 of OFDM and/or OFDMA. A transmitting device transmits modulation symbols via the sub-carriers. Note that such modulation symbols may include data modulation symbols, pilot modulation symbols (e.g., for use in channel estimation, characterization, etc.) and/or other types of modulation symbols (e.g., with other types of information included therein). OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a cyclic prefix (CP) and/or cyclic suffix (CS) (shown in right hand side of FIG. 3A) that may be a copy of the CP may also be employed within the guard interval to allow switching time (e.g., such as when jumping to a new communication channel or sub-channel) and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 3C.

FIG. 3C is a diagram illustrating another example 303 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of sub-carriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 3C shows example 303 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 3D is a diagram illustrating another example 304 of OFDM and/or OFDMA. In this example 304, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

FIG. 3E is a diagram illustrating an example 305 of single-carrier (SC) signaling. SC signaling, when compared to OFDM signaling, includes a singular relatively wide channel across which signals are transmitted. In contrast, in OFDM, multiple narrowband sub-carriers or narrowband sub-channels span the available frequency range, bandwidth, or spectrum across which signals are transmitted within the narrowband sub-carriers or narrowband sub-channels.

Generally, a communication device may be configured to include a processing circuitry and the communication interface (or alternatively a processing circuitry, such a processing circuitry 330a shown in FIG. 2B) configured to process received OFDM and/or OFDMA symbols and/or frames (and/or SC symbols and/or frames) and to generate such OFDM and/or OFDMA symbols and/or frames (and/or SC symbols and/or frames).

Various acronyms and terms are used in various embodiments, examples and definitions thereof are provided below:
AP—Access Point
ATI—Announcement Transmission Interval
BI—Beacon Interval
BSS—Base Service Set
BTI—Beacon Transmission Interval
DMG—Directional Multi-Gigabit
IE—Information Element
MAC—Media Access Control
MLME—MAC SubLayer Management Entity
PBSS—Personal Basic Service Set
PCP—Personal BSS Control Point
PPS—PCP Power Save
PS—Power Save
STA—Station
TS—Traffic Stream
TSF—Timing Synchronization Function
WGA—Wireless Gigabit Alliance
WS—Wakeup Schedule Certain wireless communication standards, protocols, and/or recommended practices (e.g., IEEE 802.11ad standard) operate by pursuing very high throughput of up to 7 Gbps in short-range wireless data transmissions.

One example of a wireless local area network (WLAN/WiFi) (e.g., an IEEE 802.11ad network) is an ad hoc network called a personal basic services set (BSS) (PBSS). Similar to the independent basic services set (IBSS), a PBSS is a type of WLAN/WiFi in which wireless communication devices (e.g., wireless stations (STAs)) communicate directly with each other. In contrast to the MSS, one STA assumes the role of the PBSS control point (PCP) in a in the PBSS. The PCP operates to provide the basic timing for the PBSS through DMG Beacon and Announce frames as well as allocation of service periods and contention-based access periods. In some instances, a PBSS can be established only by DMG STAs.

The service(s) provided by the PCP of a PBSS is/are known as the PCPS. Since all STAs within a PBSS can operate as a PCP, every STA within the PBSS is capable of providing PCPS should it become the PCP of the PBSS. Non-PCP STAs do not provide PCPS. Examples of services provided by the PCPSs may include any one or more of the following: a) Transmit Beacons, b) Association, c) Disassociation, d) Re-association, and e) Quality of Service (QoS) traffic scheduling.

FIG. 4A is a diagram illustrating an example 401 of a logical architecture of a personal basic services set (BSS) (PBSS). This diagram shows the interaction of two different wireless communication devices (e.g., a STA 1 that operates as a PCP and a STA 2) that communicate via a IEEE 802.11 media access control (MAC)/physical layer (PHY) communication link within an IEEE 802.11 basic services set (BSS). Considering operation based on the IEEE 802.11ad specification as an example mode of operation, operation based on the PCP Power Save (PPS) mode allows a PCP to sleep at intervals to minimize the energy consumption. The PCP operating in PPS mode can choose an independent wakeup schedule to sleep for one or more consecutive beacon intervals and does not transmit DMG Beacons during this time.

FIG. 4B is a diagram illustrating an example 402 of a wakeup schedule (WS) information element (IE). Such a WS IE may be implemented based on the IEEE 802.11ad specification. Such a WS IE may be used to schedule the wakeup and sleeping of PCPs and STAs. For an example of operation, an AP/PCP may generate and transmit such a WS IE to one or more STAs to schedule the wakeup and sleeping of PCPs and STAs. For example, this example of a WS IE includes an element ID field (1 octet), a length field (1 octet), a beacon interval (BI) start time field (4 octets), a sleep cycle field (2 octets), and a number of awake/doze BIs field (2 octets).

Various operations may be performed based on certain communication standards, protocols, and/or recommended practices (e.g., IEEE 802.11ad standard). For example, a Wakeup Schedule element may be used to define two types of beacon intervals (BIs) as follows:
(1) Doze BI: a BI that is explicitly defined as a Doze BI in the last, if any, Wakeup. Note that a schedule element successfully transmitted by the PCP in the case of PCP power save mode; and
(2) Awake BI: a BI that is not defined as a Doze BI. When operating based on such a mode of operation, a PCP/STA may operate in one of two power states as follows: (1) Awake: STA is fully powered; and (2) Doze: STA is not able to transmit or receive and consumes very low power.

Note that such Awake and Doze states may be used to save power, but they may also be used for other purposes. For example, they may be used to operate in another network (e.g., such as in the situation of operating with multiple BSSs). In such a situation, a Doze state could be used meaning that the respective device is unavailable with respect to a given BSS. In general, note that while many examples and embodiments in this disclosure use reference to low-power operation and power saving, the Doze state may be entered for other applications as well without departing from the scope and spirit of the invention (e.g., such as serving multiple networks or co-existence with other radio technologies). Also, providing for a faster transition into Doze state would benefit such other application as well (e.g., lower latency when serving multiple networks).

A PCP in PPS mode (PPS PCP) may enter the Doze state for one or more consecutive BIs in order to minimize its energy consumption. For example, considering operation in a PBSS, the DMG STAs expect to receive at least one DMG Beacon frame or one Announce frame every dot11BeaconPeriod×dot11MaxLostBeacons time units (TUs). These terms, dot11BeaconPeriod and dot11MaxLostBeacons, correspond to an IEEE 802.11 beacon period and a maximum lost number of beacons that may be allowed to elapse (e.g., after transmission of a WS, after a BI, and/or after a predetermined period of time, etc.) before the PCP is permitted to perform energy or power management (e.g., low power mode, sleep mode, energy savings mode, etc.). For example, the device may need to wait for dot11MaxLostBeacons×Beacon Interval amount of time before it can actually perform energy or power management.

For an example of operation, to enter lower save (PS) mode, the PCP announces the start of the first PCP Doze BI and the length of the PCP sleep interval through the Wakeup Schedule element and includes this element within DMG Beacon or Announce frames. The Wakeup Schedule element shall be transmitted at least dot11MaxLostBeacons times before the PCP goes into PS mode. The PCP enters PS mode at the instant specified by the value of the BI Start Time field of the corresponding Wakeup Schedule element. In order to transition from PS mode to active mode, the PCP shall stop including Wakeup Schedule elements in DMG Beacon and Announce frames.

The PCP may include in the Extended Schedule element the schedule for the beacon intervals during the PCP Doze BIs. The PCP may schedule a scheduled period (SP) or a contention based access period (CBAP) within a Doze BI by setting the Allocation Start field of the new SP or CBAP in the Extended Schedule element to a value within a Doze BI. If the Extended Schedule element is transmitted, the PCP shall transmit it at least dot11MaxLostBeacons times before the PPS PCP enters the Doze state.

The PCP may enter and remain in the Doze state for any portion of an SP if it is not a source or a destination of the SP. Note also that a device operating as a PCP can be any of a variety of types of devices (e.g., a wall/power line powered device, a battery powered fixed or portable device such as a laptop, mobile phone, PDA device, etc.). Power consumption can be a very important factor for many types of devices including battery powered devices and can contribute for successful commercialization. A PCP can enter PPS mode as described above to opportunistically save power whenever possible. This disclosure presents novel approaches, methods, etc. that allow a PCP device to save additional power.

In some examples, the PCP waits for dot11MaxLostBeacons number of beacon intervals before it can go to low power mode, leading to wastage of power. Novel methods are proposed herein that allow a PCP device to enter low power mode quickly and hence save additional power.

In another example of operation, after a PCP decides that it can enter PPS mode, it can be configured to include its decided wakeup schedule and any other traffic schedule information in dot11MaxLostBeacons number of consecutive beacons to ensure that every STA in the PBSS gets the sleep schedule and traffic scheduling information before it can enter PPS mode. Based on such operation, note that the first Doze BI will be at least dot11MaxLostBeacons number of Beacon Interval later from the time the PCP decides to enter PPS mode. This means that the PCP is in Awake state for at least dot11MaxLostBeacons number of consecutive Beacon Intervals before it can go to Doze state. This prevents the PCP from saving (dot11MaxLostBeacons× Beacon Interval) amount of time worth of power each time it wants to enter PPS mode. This period of time could be very significant since the PCP most likely enters PPS mode and exit PPS mode very frequently given the nature of various use cases and applications.

FIG. 4C is a diagram illustrating an embodiment of a method 403 for execution by one or more wireless communication devices for a personal BSS control point (PCP) to enter the power save (PS) mode. The method 401 begins by deciding to enter personal PCP power save (PPS) (block 410). The method 401 continues by sending a beacon frame with a wakeup schedule (WS) (block 420). Within a next beacon interval (BI), the method 401 then operates by determine whether the WS has been sent in a dot11MaxLostBeacons number of beacons (block 430). If fewer than a dot11MaxLostBeacons number of beacons have been sent, the method 403 loops back to block 420. Alternatively, if a dot11MaxLostBeacons number of beacons have been sent, the method 403 entered PPS mode (block 440).

Based on such operation, since all beacon frames transmitted by PCP may not be received by all the STAs, the IEEE 802.11ad specification mandates PCP transmitting its WS IE and any Extended Schedule IE about data traffic between STAs in the PBSS during the time the PCP is in sleep mode, in at least dot11MaxLostBeacons beacon intervals so that every STA in the PBSS receives the WS and Extended Schedule IE if any, and is aware that the PCP is going to enter power save mode. The WS lets the STAs know which beacon intervals during which the PCP will be in low power mode and when it will not transmit any beacons. The STAs will also become aware of the traffic schedule, if any, when the PCP is sleeping.

FIG. 5A is a diagram illustrating an example 501 of a PBSS with one wireless station (STA) where PCP is a battery-powered device. This diagram shows a personal basic services set (BSS) (PBSS) that includes a PCP that may be a battery-powered device such as a laptop computer in communication with a STA such as a camera.

FIG. 5B is a diagram illustrating an example 502 of a PBSS with multiple STAs where PCP is a battery-powered device. This diagram shows another example of PBSS with multiple STAs that includes a PCP that may be a battery-powered device such as a laptop computer in communication with a STA 1 such as a camera and a STA 2 such as a PDA, cell phone, etc. Note that the STA 1 and STA 2 may communicate with one another directly without requiring interaction via the PCP.

FIG. 5C is a diagram illustrating another example 503 of a PBSS with multiple STAs where PCP is a battery-powered device. This diagram shows another example of PBSS with multiple STAs that includes a PCP that may be a battery-powered device such as a laptop computer in communication with a STA 1 such as a TV, HDTV, etc. and a STA 2 such as a PDA, cell phone, etc. Note that the STA 1 and STA 2 may communicate with one another directly without requiring interaction via the PCP.

FIGS. 5A, 5B, and 5C above shows various examples of PBSSs (e.g., such as based on 802.11ad) where the PCP is a battery powered device. In such examples, power saving may become very critical. For example, whenever the PCP (e.g., laptop, which may be a battery-powered laptop) sees an opportunity to sleep, if it has to wait for dot11MaxLostBeacons×Beacon Interval amount of time before it can actually go to low power mode, then it may not be able to save significant power, since it may have to wake up soon to transmit beacons or to receive data from connected STA. In some examples, a Beacon Interval is 100 milli-seconds (ms) and dot11MaxLostBeacons is 20. In such cases, the PCP will have to wait for 2 seconds (e.g., 100 ms×20=2 seconds) to enter sleep mode once it sees an opportunity to sleep, which can be highly inefficient since the PCP cannot save 2 seconds worth of power.

This disclosure presents several novel methods by which the PCP can enter low power mode much quickly and will not have to always wait for dot11MaxLostBeacons×Beacon Interval amount of time before performing power or energy management. In other words, using such proposed methods and their equivalents, the first Doze BI can start much earlier than dot11MaxLostBeacons number of beacon intervals after the PCP decides to enter low power mode. Using such methods, PCP can enter low power mode much more quickly and save more power.

Figure 6A:
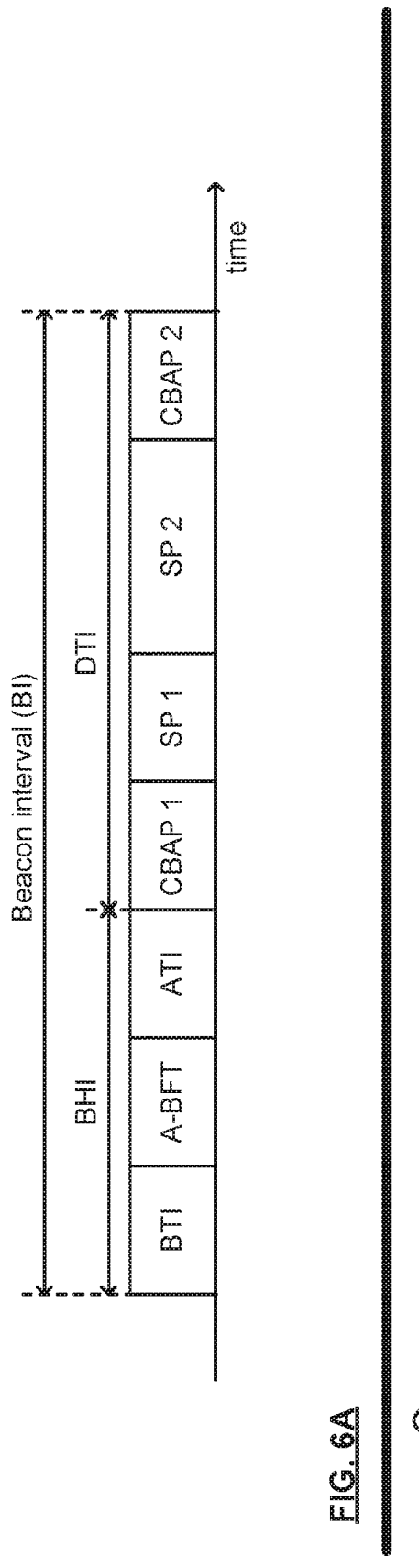
FIG. 6A is a diagram illustrating an example of frame exchanges during an announcement transmission interval (ATI).

FIG. 6A is a diagram illustrating an example 601 of frame exchanges during an announcement transmission interval (ATI). A beacon interval (BI) includes a beacon header interval (BHI) followed by a data transfer interval (DTI). In this diagram, the BHI includes a beacon transmission interval (BTI), an association beamforming training (A-BFT), and an announcement transmission interval (ATI). In this diagram, the DTI includes a contention-based access period 1 (CBAPs 1), a scheduled access period (SP 1), a scheduled access period (SP 2), and a contention-based access period 2 (CBAPs 2).

Considering operation based on the IEEE 802.11ad specification, Announcement Transmission Interval (ATI), as shown in FIG. 6A, is a polling-based management period where no data frame is allowed. The presence of the ATI in a beacon interval is optional, and signaled in DMG Beacon frames by setting the ATI Present field set to 1 in the current DMG Beacon. The Next DMG ATI information element included in the DMG Beacon frame specifies the start time and duration for the next ATI period. From this information, participating DMG STAs become aware of which subsequent BI will have the next AT period in advance.

Figure 6B:
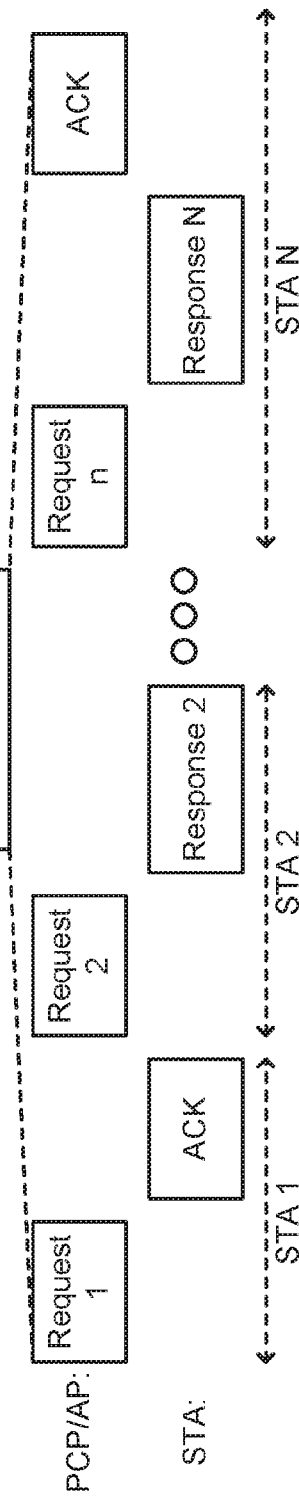
FIG. 6B is a diagram illustrating another example of frame exchanges during an ATI including communications between a personal BSS control point (PCP)/access point (AP) and various wireless stations (STAs).

FIG. 6B is a diagram illustrating another example 602 of frame exchanges during an ATI including communications between a personal BSS control point (PCP)/access point (AP) and various wireless stations (STAs). During the ATI, after a PCP/AP transmits an individually addressed request frame (such as an Announce frame) to a non-PCP/non-AP STA, and the STA receives that frame, the STA shall transmit a response frame (e.g., acknowledgement (ACK)) addressed to the PCP/AP. The PCP/AP shall interpret the receipt of the response frame as an acknowledgment of the request frame.

During the ATI, PCP/AP can send a unicast Announce frame to any DMG STA and the DMG STA which receives the Announce frame can have a chance to send a management frame waiting for being sent to PCP, or otherwise an ACK frame. The ACK frame or any management frame that PCP receives from the DMG STA at this turn is considered as an acknowledgment, meaning that the Announce frame is successfully transmitted to the DMG STA.

According to the proposed method, the PCP will let the STAs in the PBSS know that it is going to enter low power mode by including its Wakeup Schedule in an Announce Frame and unicast it to each of the individual STAs during the AT period. When the Announce Frames are ACK'd by each of the STAs, the PCP can immediately enter low power mode from the next BI onwards. Receiving ACK frames for each of the Announce Frames individually sent to STAs will imply that each of the STA has successfully received the WS and any Extended Schedule IE, and is aware of the PCPs low power mode schedule. Hence there is no need for the PCP to always transmit the WS for dot11MaxLostBeacons number of Beacon Intervals before entering low power mode. This way the PCP will be able to enter sleep mode much earlier and save more power.

Note that while some examples herein operate based on unicast transmission of the Announce Frame to each of the individual STAs with ACK from the various STAs to indicate receipt of the Announce Frame, note also that alternative operation be based instead on broadcast transmission of the Announce Frame to the STAs with no acknowledgment. In even an alternative approach, unicast transmission with acknowledgement in parallel with (e.g., in combination with) broadcast with no acknowledgment.

The operational approach can be to use broadcast "instead" of unicast (e.g., replacing the broadcast mechanism) or to use broadcast "in addition to" unicast (e.g., in parallel with, in combination with). In some situations, using broadcast "in addition to" unicast may be more effective such that, even if unicast deliveries are not acknowledged, the broadcast serves as a backup or a safety net.

Note also that while various examples of the PCP entering Awake and Doze states operate with respect to all of the other devices in the system, there may be situations where a PCP takes on different personalities individually with respect to different STAs. For example, such Awake and Doze states as used by the PCP need not be absolute or global states for the PCP, but different states may be portrayed individually to different STAs. For example, different states may be portrayed to STAs depending on whether acknowledgements have been received from those STAs of not (e.g., one state to a STA from which an acknowledgement has been received, another state to another STA from which no acknowledgement has been received, and so on). In some examples, the PCP can portray an Awake state to STAs whose acknowledgements have not been received and a Doze state to STAs whose acknowledgements have been received.

FIG. 7A is a diagram illustrating an embodiment of a method 701 for execution by one or more wireless communication devices. In some examples of operation, if a PCP sees an opportunity to enter low power mode (e.g., typically when there is no traffic to be sent or received), and it wants to enter sleep mode as soon as possible, the PCP may perform various operations to allow the PCP to enter low power mode as early as possible instead of waiting for dot11MaxLostBeacons number of beacon intervals.

Soon after the PCP decides to enter low power mode (block 710), the method 701 operates such that the PCP operates by creating a WS with the first Doze BI to be the upcoming BI (block 720). The method 701 operates such that the PCP operates by scheduling an ATI period in the upcoming BI by indicating its presence in the DMG Beacon by setting the ATI Present field to 1 (block 730). It will also include the Next ATI IE in the DMG Beacon indicating the start time and duration of ATI. The method 701 operates such that the PCP operates by sending a unicast Announce frame with WS (and any other traffic schedule information for the BIs during which it will sleep, if any) included in it, to each of the associated STAs during the ATI (block 740). In alternative operations, the method 701 may operate such that PCP operates to inform the other devices (e.g., STAs) of its wakeup schedule (WS) in an unsolicited information response frame. The PCP may operate to transmit this unsolicited information response frame via unicast to the other devices (e.g., STAs) during a contention-based access period (CBAP) and waiting for responses (e.g., ACKs) from those other devices (e.g., STAs) informing the PCP that the those other devices (e.g., STAs) are aware of the WS.

The method 701 operates such that the PCP operates by checking if it has received ACK from all STAs or not (block 750). If the PCP receives ACK from all STAs, that would mean all STAs in the PBSS are aware of the WS of the PCP and the PCP will then enter low power mode starting from the next BI onwards (block 760). Alternatively, if the PCP does not receives ACK(s) from one or more of the STAs, the method loops back to block 720.

Sometimes, the PCP may not get ACK from all STAs in the PBSS due to various reasons (interference, poor signal strength). If the PCP does not get the ACK from all of the associated STAs, then according to this method, it will attempt again in the following BI (e.g., loops back to block 720). It will schedule another ATI in the upcoming BI. Note that there may be situations where a STA receives a WS such that the PPS could be at some time in the past (e.g., the start time of the PPS has already passed before the STA receives the WS, and/or the start time points to a time in the past). This may be done in the situation when the WS has changed, and as such, the changed WS is then re-transmitted to all STAs. If the PCP gets the ACK from each of the STAs, then it will enter PPS mode starting from the upcoming beacon interval, or else try once again as mentioned above.

FIG. 7B is a diagram illustrating an example 702 of a message sequence between various wireless communication devices (e.g., a personal BSS control point (PCP) and two STAs: STA 1 and STA 2). This diagram shows a message sequence between PCP and STA1 & STA2, which are part of the PBSS. The PBSS has two STAs (STA1 & STA2) associated to PCP. The PCP decides to enter power save (PS) mode (block 711). The PCP then schedules ATI (block 721) and sends Announce Frame with WS to both the STAs (blocks 731 and 741). After receiving the ACK (from STA 1 in block 751 and from STA 2 in block 761), it enters PPS mode (block 771).

With respect to certain applications, note that some may be time critical and others may not be time critical. For example, some applications (e.g., station management entity (SME)) may plan for the PCP to enter PPS mode in advance. If the PCP decides to enter PPS mode, but there is no need for it to enter sleep mode as early as possible, but it may need to enter low power mode only some pre-determined beacon intervals later, and then other efficient methods can be implemented as proposed in this portion of the disclosure.

Since transmission of WS in Announce frames during ATI as proposed herein may be performed within a time critical portion may be an efficient way to confirm the STAs receive the WS of PCP, it may take away some amount of additional airtime that has to be reserved for ATI (ATI duration). If the PCP does not need to enter low power mode immediately, then an adaptive method can be adopted. According to such an adaptive method, the PCP will schedule ATI and transmit Announce frames only if the PPS start time (first Doze BI start time) is within certain predetermined threshold beacon intervals. If the PPS mode start time is beyond the threshold beacon interval time offset, then the PCP can transmit its WS in DMG Beacons only and can optimize the airtime used (ATI need not be reserved).

FIG. 8A is a diagram illustrating another embodiment of a method 801 for execution by one or more wireless communication devices. The method 801 operates such that the PCP decides to enter PS mode 'n' BIs later (block 810, where n is a positive integer). The method 801 continues such that the PCP operates by creating a WS with the first Doze BI to be 'n' BIs later (block 820). Then, method 801 continues by determining whether the start of the first Doze BI is below certain predetermined threshold number of beacon intervals (block 830), and if yes, the PCP will schedule ATI (block 832) and unicast Announce frames with WS to each of the associated STAs in the PBSS (block 840). If the PCP receives an ACK from each of them (block 850), it will enter PPS mode as per the scheduled time included in the WS (block 860).

If the PCP does not receive ACKs from each of the STAs (no in block 850), it will reschedule ATI in the next BI and retransmit the same WS in Announce frame to the remaining set of STAs from which the PCP has not yet received the ACK. The PCP will keep track of which STAs it has not received ACK from, and would retransmit the same Announce frame to only those STAs since in this case the WS is not changing (the start time of the PPS mode is fixed). Once the PCP gets ACK from all the STAs, it will then stop scheduling ATI and stop sending any Announce frames, and enter low power mode in the scheduled time (block 860).

If the start of the first Doze BI is more than threshold number of beacon intervals later (block 830), the PCP then operates to broadcast WS in DMG beacons (block 834), and then enter PPS mode when the scheduled time arrives (block 860).

FIG. 8B is a diagram illustrating an example 802 of beacon transmission intervals (BTI) and contention-based access periods (CBAPs). Such operation may be based according to an awake window. For example, according to the IEEE 802.11ad specification, there might be one or more CBAPs in a beacon interval. An Awake window is present within the first CBAP of a beacon interval if the Awake Window field in the Awake Window element has a value that is nonzero. The Awake window starts from the beginning of the first CBAP and has a duration that is defined by the value of the Awake Window field in the Awake Window element included in the DMG Beacon. During the Awake window, a STA shall transmit only ATIM frames. A DMG STA in PS mode shall be in the Awake state during each Awake window that lies within each Awake BI for that STA. If a STA receives or transmits an ATIM frame during the Awake Window, it shall be awake during the CBAP(s) within the current beacon interval that have the source AID or destination AID described by the ATIM frame to wait for the announced MSDU(s) and/or MMPDU(s) to be received and/or to transmit announced MSDU(s) and/or MMPDU(s). A STA that receives or transmits an ATIM frame during the Awake Window may enter the Doze state when it has successfully transmitted to and received from all corresponding peer STAs for that beacon interval.

PCP is supposed to schedule Awake Window in every beacon interval. The PCP is also supposed to transmit DMG beacons regularly so that all the STAs in the PBSS have their TSF in sync. So this requirement may not allow PCP to be in sleep mode continuously for extended length of time. If in a PBSS, there is only one STA as in case shown in FIG. 1, the PCP will either be source or destination of data. According to this proposed method, if the PCP is not transmitting any data, it can opportunistically sleep for the remaining beacon interval time after BTI in every beacon interval for as many number of consecutive beacon intervals it wants to. The length can be as short as just one BI or as long as 'n' BIs. This can be shown as below.

According to this method of operation the PCP will not schedule any Awake Window in the beacon intervals that it wants to Doze. Since it will not schedule any Awake Window for a BI, the peer STA will not be able to send any ATIM frame to indicate that it has traffic to send, and no data or management frames will be sent to the PCP in that BI during any of the CBAPs.

FIG. 8C is a diagram illustrating another embodiment of a method 803 for execution by one or more wireless communication devices. according to method 803, once the PCP decides it needs to Doze for 'n' BIs (block 811) while still transmitting DMG Beacons, it will not schedule Awake Window for 'n' consecutive BIs (e.g., it will not include any Awake Window IE in its Beacons (block 821)). For every BI, the PCP will transmit DMG Beacons without scheduling any Awake Window. After transmitting DMG Beacons, it will Doze for the remaining BI time and save power (block 831). It will then wake up at the end of BI, and check if 'n' BIs have passed (block 841). If not, it will repeat the steps (blocks 821, 831, 841) until it has Dozed for 'n' consecutive beacon intervals. Alternatively, if 'n' BIs have passed (block 841), the method 803 operates such that the PCP resumes awake window scheduling in DMG beacons (block 851).

The method 803 allows a PCP to save power by entering Doze mode without the need for transmitting any WS for dot11MaxLostBeacons number of beacon intervals. Hence it is a quick way by which PCP can save power when needed.

FIG. 9A is a diagram illustrating another embodiment of a method 901 for execution by one or more wireless communication devices. The method 901 begins by generating an announcement frame (AF) that includes information specifying a start time and/or a periodicity corresponding to a low power or sleep mode of the WDEV (block 910). The method 901 continues by transmitting (e.g., via a communication interface of the WDEV) the announcement frame to other WDEVs (block 920). Such transmission of the announcement frame may be made using any of a number of different signaling types (e.g., unicast, OFDMA, MU-MIMO, etc. and/or any combination thereof).

The method 901 then operates by determining whether responses have been received from the other WDEVs (e.g., a first response from a first other WDEV, a second response from a second other WDEV, etc.) (block 930) and if yes, the method 901 continues by entering into the low power or sleep mode (block 940). This determination may be made within a particular period of time (e.g., ΔT). Alternatively, if at least one response has not been received from at least one of the other WDEVs (block 930) and if no, then the method 901 ends.

FIG. 9B is a diagram illustrating another embodiment of a method for 902 execution by one or more wireless communication devices. The method 902 begins by generating an AF that includes information specifying a start time and/or a periodicity corresponding to a low power or sleep mode of the WDEV (block 911). The method 902 continues by transmitting (e.g., via a communication interface of the WDEV) the announcement frame to other WDEVs (block 921). Such transmission of the announcement frame may be made using any of a number of different signaling types (e.g., unicast, OFDMA, MU-MIMO, etc. and/or any combination thereof).

The method 902 then operates by determining whether fewer responses have been received than from all of the other WDEVs (e.g., a first response not received from a first other WDEV, a second response not received from a second other WDEV, etc.) (block 931) and if yes, the method 901 may continue along one of two paths. This determination of whether fewer responses have been received than from all of the other WDEVs may be made within a particular period of time (e.g., ΔT).

In one example extending from a determination of yes in block 921 (e.g., fewer than all response received), the method 902 continues by waiting an additional period of time (e.g., ΔT') to determine whether responses have been received from the other WDEVs (e.g., a first response from a first other WDEV, a second response from a second other WDEV, etc.) (block 933) if yes, and entering into the low power or sleep mode (block 941).

In another example extending from a determination of yes in block 921 (e.g., fewer than all response received), the method 902 continues by waiting a predetermined number of beacon intervals (BIs) (block 935) if then entering into the low power or sleep mode (block 941) even if fewer than all response received.

As described herein with respect to some examples of operation in DMG networks, the PCP announces the time of transition to PCP Power Save (PPS) mode by including a DMG Wakeup Schedule element in DMG Beacon or Announce frames for a minimum of dot11MaxLostBeacons times before the transition. This requirement limits how soon the PCP can enter the PPS mode from the time a decision is made at the PCP SME; it also increases the number of required PCP Doze BIs (resulting in larger application-level latency) when trying to meet a certain power consumption target for the PCP. Using various approaches as described herein, advertisements of the DMG Wakeup Schedule element over dot11MaxLostBeacons can be shortened if reception of the element by each associated non-PCP STA has been confirmed through unicast delivery. Also, the PCP can attempt to enter the PPS mode in as early as the subsequent beacon interval as long as it can track the delivery of the DMG Wakeup Schedule element and upstream traffic (non-PCP STA to PCP) on a per-STA basis.

FIG. 10A is a diagram illustrating an example 1001 of a transition to PCP power save (PPS) mode. This diagram illustrates a simple interpretation of "advertising the DWS element for at least dot11MaxLostBeacons times before entering the PPS mode" based on the assumptions that (A) No Doze BI can be used to advertise the DWS element (i.e., beginning of the next PPS entry cannot be advertised while in PPS mode), and (B) the BI Start Time field in all transmitted DWS element points to a time in the future. We note that with this interpretation and with typical values for dot11MaxLostBeacons and dot11BeaconPeriod the transition to PPS mode requires several hundred milli-seconds (ms). Also, to achieve a desired duty cycle, the large number of required Awake BIs needs to be offset with a larger number of Doze BIs, which results in worst case application latencies of few seconds. For example, achieving a duty cycle of 25% with dot11MaxLostBeacons=8 would require 24 PCP Doze BIs, resulting in worst case application latency of close to 2.5 seconds when dot11BeaconPeriod=100 TU.

FIG. 10B is a diagram illustrating another example 1002 of a transition to PPS mode. This diagram illustrates a more efficient interpretation of "advertising the DWS element for at least dot11MaxLostBeacons times before entering the PPS mode" by removing assumption (A). Using Doze BIs to advertise the DWS element for the next set of Doze BIs is possible and improves the responsiveness. For example, achieving a duty cycle of 25% with dot11MaxLostBeacons=8 would now require 6 PCP Doze BIs (and 2 Awake BIs), resulting in worst case latency of close to 600 milliseconds with dot11BeaconPeriod=100 TU.

Now further assume the BI Start Time field (parameter T in FIG. 10A and FIG. 10B, which remains the same in all transmitted instances of the DWS element) does not have to point to a time in future (e.g., both assumptions (A) and (B) above are removed). Consider the same scenario with dot11MaxLostBeacons=8, and further assume that the DWS element is advertised to three associated STAs—STA A, STA B and STA C—through Announce frames (or through other unicast frames that are acknowledged). For the sake of discussion the beacon interval where the DWS element is first transmitted is numbered 0.

FIG. 10C is a diagram illustrating another example of a transition to PPS mode this diagram shows a scenario where transition to PPS mode is planned in 3 beacon intervals. The PCP advertises the DWS element through Announce frames sent to the three STAs. In this scenario some of the Announce frames (or acknowledgements to Announce frames) are lost as follows:

BI 0: PCP confirms reception by STA A, unable to confirm reception by STA B and STA C.

BI 1: PCP still unable to confirm reception by STA B and STA C.

BI 2: PCP confirms reception by STA B, unable to confirm reception by STA C.

BI 3 is the beginning of the PCP Doze BIs according to the advertised DWS element; however, since the PCP has not confirmed reception of the element by STA C, it will stay in active mode to make itself available to STA C (that is, assuming suitable allocations such as allocations with broadcast Source or Destination AID that allow STA C to transmit to PCP; otherwise PCP can just enter the PPS mode). Specifically, PCP withholds any downstream traffic to all three STAs, and stays available to STA C for possible upstream traffic, wherever STA C has a chance to transmit in accordance with the allocation rules. During BI 3, and subsequent BIs, as long as necessary, the PCP schedules an ATI and attempts to deliver a DWS element to STA C at minimum. In this example, the PCP confirms reception of the element by STA C in BI 3, and enters the PPS mode for the next 2 beacon intervals remaining in its advertised schedule. We note however, that this scenario is rather extreme, and unicast delivery of the DWS element to a few STAs is very likely completed over one or two beacon intervals, especially since unicast frames can be repeated over the same beacon interval.

For comparison, with both assumptions (A) and (B) removed, and a PCP Doze schedule that starts at the "next beacon interval", the PCP can achieve a 25% duty cycle almost all the time with 1 Awake BI and 3 Doze BIs—resulting in a worst case application latency of 300 milli-seconds.

As can be seen based on the operation herein, the PCP can attempt to enter the PPS mode as early as "the next BI". The PCP may need to stay in active mode for one or more BIs into the advertised power save schedule if it has not been able to confirm that all STAs that could possibly transmit to the PCP have received its DWS element.

At worst this is the same as the dot11MaxLostBeacons rule (and associated application level latency), but almost always it is more efficient; the PCP has a high chance of successfully communicating the DWS element to one or two associated STAs in one ATI period (one beacon interval) and start its PCP Doze BIs as early as the next BI, in contrast with having to wait for 4, 8 or more beacon intervals.

To enter PPS mode based on PCP Power management mode, the PCP announces the start of the first PCP Doze BI and the number of successive PCP Doze BIs through the DMG Wakeup Schedule element and includes this element within DMG Beacon, Announce or any other frame that can communicate the intended PCP doze schedule to non-PCP STAs. The PCP may enter the PPS mode after it has transmitted the DMG Wakeup Schedule element to each associated STA over at least dot11MaxLostBeacons beacon intervals or it has confirmed that each associated STA has received the PCP's DMG Wakeup Schedule element.

The first PCP Doze BI starts at the instant specified by the value of the BI Start Time field in the announced DMG Wakeup Schedule element, unless the PCP has not been able to confirm the reception of the element by each associated STA and the PCP has not transmitted the element to each associated STA over dot11MaxLostBeacons beacon intervals, in which case the first PCP Doze BI is delayed until at least one of the two conditions is met. The number of successive PCP Doze BIs is equal to value of the Number of Awake/Doze BIs field in the DMG Wakeup Schedule element minus the number of beacon intervals between the intended and actual time of the PCP transition to PPS mode. During the period between the intended transition to PPS mode and the actual transition time, the PCP shall not establish any Awake windows, but shall make itself available to any possible frame exchange initiated by any STA that the PCP determines may not have received the DMG Wakeup Schedule element.

Note also that an announced set of PCP Doze BIs may be shortened or missed altogether if the intended start time is delayed because the PCP has not has not been able to confirm the reception of its DMG Wakeup Schedule element by each associated STA or the PCP has not transmitted the DMG Wakeup Schedule element to each associated STA over dot11MaxLostBeacons beacon intervals.

It is noted that the various operations and functions described within various methods herein may be performed within a wireless communication device (e.g., such as by the processing circuitry 330, communication interface 320, and memory 340 or processing circuitry 330a such as described with reference to FIG. 2B) and/or other components therein. Generally, a communication interface and processing circuitry (or alternatively a processing circuitry that includes communication interface functionality, components, circuitry, etc.) in a wireless communication device can perform such operations.

Examples of some components may include one of more baseband processing modules, one or more media access control (MAC) layer components, one or more physical layer (PHY) components, and/or other components, etc. For example, such a processing circuitry can perform baseband processing operations and can operate in conjunction with a radio, analog front end (AFE), etc. The processing circuitry can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processing circuitry in a first device and another processing circuitry within a second device. In other embodiments, such processing is performed wholly by a processing circuitry within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" or their equivalents may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processing circuitries, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, a processing circuitry, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
a communication interface; and
processing circuitry that is coupled to the communication interface, wherein at least one of the communication interface or the processing circuitry configured to:
generate an announcement frame that includes information specifying a start time and a periodicity corresponding to a low power or sleep mode of the wireless communication device;
transmit the announcement frame to a plurality of other wireless communication devices;
enter into the low power or sleep mode after receiving a plurality of responses respectively from the plurality of other wireless communication devices within a predetermined period of time, wherein the plurality of responses includes one respective response from each of the plurality of other wireless communication devices, are in response to the announcement frame, and are received by the wireless communication device within the predetermined period of time, wherein the start time is delayed by an extended time period when fewer than the plurality of responses are received respectively from the plurality of other wireless communication devices within the predetermined period of time; and
enter into the low power or sleep mode after receiving the plurality of responses respectively from the plurality of other wireless communication devices within another predetermined period of time that includes the predetermined period of time and the extended time period, wherein the plurality of responses includes one respective response from each of the plurality of other wireless communication devices.

2. The wireless communication device of claim 1, wherein the processing circuitry is further configured to:
enter into the low power or sleep mode when fewer than the plurality of responses are received respectively from the plurality of other wireless communication devices within the predetermined period of time and after a predetermined number of beacon intervals (BIs) have elapsed.

3. The wireless communication device of claim 1, wherein the processing circuitry is further configured to:
when no response is received from a first other wireless communication device of the plurality of other wireless communication devices, operate in an awake mode with respect to the first other wireless communication device of the plurality of other wireless communication devices; and
when a response of the plurality of responses is received from a second other wireless communication device of the plurality of other wireless communication devices, operate in the low power or sleep mode with respect to the second other wireless communication device of the plurality of other wireless communication devices.

4. The wireless communication device of claim 1, wherein the processing circuitry is further configured to at least one of:
transmit the announcement frame to at least one of the other wireless communication devices based on unicast signaling;
receive a response of the plurality of responses from the at least one of the other wireless communication devices based on unicast signaling;
transmit the announcement frame to the plurality of other wireless communication devices based on at least one of orthogonal frequency division multiple access (OFDMA) or multi-user multiple-input-multiple-output (MU-MIMO) signaling; or
receive the plurality of responses respectively from the plurality of other wireless communication devices based on at least one of the OFDMA or the MU-MIMO signaling.

5. The wireless communication device of claim 1 further comprising:
the communication interface is configured to support communications within at least one of a satellite communication system, a wireless communication system, a wired communication system, a fiber-optic communication system, or a mobile communication system; and the processing circuitry configured to at least one of transmit the announcement frame or to receive at least one of the plurality of responses via the communication interface.

6. The wireless communication device of claim 1 further comprising:

an access point (AP) or a personal basic services set (BSS) control point (PCP), wherein the plurality of other wireless communication devices includes a wireless station (STA).

7. The wireless communication device of claim 1 further comprising:

a battery-powered wireless communication device.

8. A wireless communication device comprising:

a communication interface; and processing circuitry that is coupled to the communication interface, wherein at least one of the communication interface or the processing circuitry configured to:

generate an announcement frame that includes information specifying a start time and a periodicity corresponding to a low power or sleep mode of the wireless communication device;

transmit the announcement frame to a plurality of other wireless communication devices;

enter into the low power or sleep mode after receiving a plurality of responses respectively from the plurality of other wireless communication devices within a predetermined period of time, wherein the plurality of responses includes one respective response from each of the plurality of other wireless communication devices, are in response to the announcement frame, and are received by the wireless communication device within the predetermined period of time; and when fewer than the plurality of responses are received respectively from the plurality of other wireless communication devices within the predetermined period of time:

delay the start time by an extended time period and enter into the low power or sleep mode after receiving the plurality of responses respectively from the plurality of other wireless communication devices within another predetermined period of time that includes the predetermined period of time and the extended time period, wherein the plurality of responses includes one respective response from each of the plurality of other wireless communication devices; and wherein, when the plurality of responses are not received within the extended time period, enter into the low power or sleep mode after a predetermined number of beacon intervals (BIs) have elapsed.

9. The wireless communication device of claim 8, wherein the processing circuitry is further configured to:

when no response is received from a first other wireless communication device of the plurality of other wireless communication devices, operate in an awake mode with respect to the first other wireless communication device of the plurality of other wireless communication devices; and when a response of the plurality of responses is received from a second other wireless communication device of the plurality of other wireless communication devices, operate in the low power or sleep mode with respect to the second other wireless communication device of the plurality of other wireless communication devices.

10. The wireless communication device of claim 8, wherein the processing circuitry is further configured to at least one of:

transmit the announcement frame to at least one of the other wireless communication devices based on unicast signaling;

receive a response of the plurality of responses from the at least one of the other wireless communication devices based on unicast signaling;

transmit the announcement frame to the plurality of other wireless communication devices based on at least one of orthogonal frequency division multiple access (OFDMA) or multi-user multiple-input-multiple-output (MU-MIMO) signaling; or receive the plurality of responses respectively from the plurality of other wireless communication devices based on at least one of the OFDMA or the MU-MIMO signaling.

11. The wireless communication device of claim 8 further comprising:

the communication interface configured to support communications within at least one of a satellite communication system, a wireless communication system, a wired communication system, a fiber-optic communication system, or a mobile communication system; and the processing circuitry configured to at least one of transmit the announcement frame or to receive at least one of the plurality of responses via the communication interface.

12. The wireless communication device of claim 8 further comprising:

an access point (AP) or a personal basic services set (BSS) control point (PCP) that is a battery-powered wireless communication device, wherein the plurality of other wireless communication devices includes a wireless station (STA).

13. A method for execution by a wireless communication device, the method comprising:

generating an announcement frame that includes information specifying a start time and a periodicity corresponding to a low power or sleep mode of the wireless communication device;

transmitting, via a communication interface of the wireless communication device, the announcement frame to a plurality of other wireless communication devices;

entering into the low power or sleep mode after receiving, via the communication interface of the wireless communication device, a plurality of responses respectively from the plurality of other wireless communication devices within a predetermined period of time, wherein the plurality of responses includes one respective response from each of the plurality of other wireless communication devices, are in response to the announcement frame, and are received by the wireless communication device within the predetermined period of time, wherein the start time is delayed by an extended time period when fewer than the plurality of responses are received respectively from the plurality of other wireless communication devices within the predetermined period of time; and entering into the low power or sleep mode after receiving the plurality of responses respectively from the plurality of other wireless communication devices within another predetermined period of time that includes the predetermined period of time and the extended time period, wherein the plurality of responses includes one respective response from each of the plurality of other wireless communication devices.

14. The method of claim 13 further comprising:
entering into the low power or sleep mode when fewer than the plurality of responses are received respectively from the plurality of other wireless communication devices within the predetermined period of time and after a predetermined number of beacon intervals (BIs) have elapsed.

15. The method of claim 13 further comprising:
when no response is received from a first other wireless communication device of the plurality of other wireless communication devices, operating in an awake mode with respect to the first other wireless communication device of the plurality of other wireless communication devices; and
when a response of the plurality of responses is received from a second other wireless communication device of the plurality of other wireless communication devices, operating in the low power or sleep mode with respect to the second other wireless communication device of the plurality of other wireless communication devices.

16. The method of claim 13 further comprising at least one of:
transmitting, via the communication interface of the wireless communication device, the announcement frame to at least one of the other wireless communication devices based on unicast signaling;
receiving, via the communication interface of the wireless communication device, a response of the plurality of responses from the at least one of the other wireless communication devices based on unicast signaling;
transmitting, via the communication interface of the wireless communication device, the announcement frame to the plurality of other wireless communication devices based on at least one of orthogonal frequency division multiple access (OFDMA) or multi-user multiple-input-multiple-output (MU-MIMO) signaling; or
receiving, via the communication interface of the wireless communication device, the plurality of responses respectively from the plurality of other wireless communication devices based on at least one of the OFDMA or the MU-MIMO signaling.

17. The method of claim 13, wherein the wireless communication device includes an access point (AP) or a personal basic services set (BSS) control point (PCP) that is a battery-powered wireless communication device, and the plurality of other wireless communication devices includes a wireless station (STA).

18. The method of claim 13 further comprising:
operating the communication interface of the wireless communication device to support communications within at least one of at least one of a satellite communication system, a wireless communication system, a wired communication system, a fiber-optic communication system, or a mobile communication system.

* * * * *